United States Patent [19]
Bracey et al.

[11] Patent Number: 5,904,178
[45] Date of Patent: May 18, 1999

[54] GAS FILTER FOR REGULATOR VALVE, AND IMPROVED REGULATOR VALVE EMPLOYING THE FILTER

[75] Inventors: Christopher Bracey, Norfolk; John Friedrichs, Virginia Beach; Kevin Bailey, Portsmouth, all of Va.

[73] Assignee: Controls Corporation of America, Virginia Beach, Va.

[21] Appl. No.: 08/879,332

[22] Filed: Jun. 20, 1997

[51] Int. Cl.⁶ .................................................. G05D 16/06
[52] U.S. Cl. ...................... 137/505.42; 137/549
[58] Field of Search .............. 137/505.41, 505.42, 137/544, 549

[56] References Cited

U.S. PATENT DOCUMENTS

| | | | |
|---|---|---|---|
| 2,069,808 | 2/1937 | Andersson | 137/505.41 |
| 2,348,548 | 5/1944 | Koehler | 251/167 |
| 2,612,728 | 10/1952 | Jacobsson | 137/505.42 |
| 2,899,973 | 8/1959 | Carlson | 137/505.41 |
| 3,198,206 | 8/1965 | O'Brien | 137/315 |
| 3,204,925 | 9/1965 | Montuori | 251/274 |
| 3,356,335 | 12/1967 | Koch et al. | 251/214 |
| 3,615,072 | 10/1971 | Kaucher | 251/265 |
| 4,094,337 | 6/1978 | Robinson | 137/505.42 |
| 4,778,150 | 10/1988 | Pratt et al. | 251/214 |
| 4,811,929 | 3/1989 | Scaramucci | 251/122 |
| 4,917,355 | 4/1990 | Dark et al. | 251/214 |
| 5,106,055 | 4/1992 | Phillips | 251/264 |
| 5,123,442 | 6/1992 | Geuy et al. | 137/505.42 X |
| 5,351,936 | 10/1994 | Tanikawa et al. | 251/278 |
| 5,375,813 | 12/1994 | Rozinsky | 251/333 |

OTHER PUBLICATIONS

Advertisement "21" & "22" Series Micro–metering Valves. Pressure Control Devices, Concoa 1991, cover page and pp. 1, 2, 25 and 26.

Fujiplate Advertisement for Laminated Metal Mesh Sintered Filter.

*Primary Examiner*—Stephen M. Hepperle
*Attorney, Agent, or Firm*—Kerkam, Stowell, Kondracki & Clarke, P.C.; Edward J. Kondracki

[57] ABSTRACT

A gas flow regulator valve is provided with a metering valve and filter assembly including a drawn, generally cup shaped, or hat shaped filter element having a substantially flat end panel, a generally cylindrical sidewall and an open end opposite the end panel. An integrally formed flange, or rim, is formed around the open end and projects outwardly therefrom to provide means for mounting the filter, in a fluid-tight relation, in the metering valve assembly body. The filter is formed from a substantially planar disc-shaped blank of a multilayered screen material in which the respective layers are welded, or sintered, to one another to form a rigid, porous filter medium. The blank is shaped by a cup drawing operation of a filter mesh made of layers of woven smooth, corrosion resistant, fine gauge, high strength metal.

9 Claims, 3 Drawing Sheets

GAS FILTER FOR REGULATOR VALVE, AND IMPROVED REGULATOR VALVE EMPLOYING THE FILTER

BACKGROUND OF THE INVENTION

1. Field of the Invention

This invention relates to regulator valves employing an improved metering valve and filter assembly, and to an improved filter assembly and method of manufacturing such an improved filter assembly for use in regulator valve.

2. Description of the Prior Art

The ever increasing requirements for higher purity gases delivered under precisely controlled conditions for use in the analytical, scientific and electronic industries places correspondingly more stringent demands on systems for delivering such gas. Flow regulator valves used in such systems which can initially accurately and dependably control the pressure of gases are known, but these valves may become less reliable with use due in part, to the erosive or abrasive effect on the valve member and valve seat of ultra fine particles in the gas stream. Efforts to remove such fine particles to provide ultra clean or ultra pure gas and to protect and prolong the life of the valves have included the use of a gas filter positioned immediately upstream of the metering valve element. One such filter which has been used commercially employs a cup-shaped, sintered powdered metal filter element having an elongated, generally cylindrical filter body, with the closed end of the cup providing a support or seat for the valve stem spring. Other systems have generally employed disc-shaped filters disposed in the gas stream.

While sintered powder metal filters have been used commercially, they have not been found entirely satisfactory for certain applications. For example, it is difficult to produce entirely uniform filters since the porosity of the filters varies not only with the size of the powdered metal particles, but also with the pressure employed to shape the element and the temperature and duration of heat applied in the sintering operation. Although uniform overall loads can be easily applied in the powdered metal compaction operation, distribution of the powdered material in the mold is not always entirely uniform so that variations in porosity can result. Further, the relatively thin sintered powdered metal filter is inherently relatively brittle, requiring great care in handling and assembly to prevent cracking, splintering or flaking of the material. Further, in use, such filters can "shed" or lose small powdered metal particles which are not completely sintered or which becomes dislodged during handling or use.

Filters formed from other materials have also been used, but they too have not been entirely satisfactory for various reasons in certain applications. For example, where the filter acts as a support for the valve closing spring, substantial strength and dimensional stability is required, but is not always provided by the known materials. For example, shaped metal screens have been used as filters, but the molding, shaping or drawing of woven metal screens results in relative movement of the screen elements or strands and can produce non-uniform screen openings. Further, the woven screen material frequently does not possess the dimensional stability and strength to serve as a valve spring support, thereby complicating the valve design. Accordingly, it is an object of the present invention to provide an improved gas filter for use in a gas control valve, and to provide an improved gas control valve employing such a filter.

It is another object to provide an improved gas filter having high strength and dimensional stability and which is not subject to shedding or cracking as a result of handling.

Another object of the invention is to provide such a filter which is highly uniform in its filtering capacity and which is capable of filtering extremely small particles from the gas stream flowing therethrough.

Another object of the invention is to provide a novel method of producing a gas flow filter.

Another object of the invention is to provide an improved gas regulator valve having an improved gas flow filter.

SUMMARY OF THE INVENTION

The foregoing and other objects and advantages are achieved in accordance with the present invention in which a gas flow regulator valve is provided with a metering valve and filter assembly including a drawn, generally cup shaped, or hat shaped filter element including a substantially flat end panel, a generally cylindrical sidewall and an open end opposite the end panel. An integrally formed flange, or rim, is formed around the open end and projects outwardly therefrom to provide means for mounting the filter, in a fluid-tight relation, in the metering valve assembly body. The filter is formed from a substantially planar disc-shaped blank of a multilayered screen material in which the respective layers are welded, or sintered, to one another to form a rigid, porous filter medium.

The blank is shaped by a conventional drawing operation in which the blank is clamped around its peripheral portions and pressed through an opening in a forming die. Such a conventional cup drawing operation is employed, for example, as the initial stage of forming the deep drawn container shown in U.S. Pat. No. 4,414,836. In such a cupping operation, an outwardly directed flange may be formed at the open top of the cup, which flange may be trimmed, as in a die cutting operation, to form the retaining flange for the filter. As an alternative, the open end of the filter cup may be pressed completely through the die or trimmed to provide a cylindrical wall to the open top, and an annular retaining ring positioned around the cylindrical wall adjacent to its open end and bonded thereto as by a welding operation.

The filter of the present invention may be formed from a known multilayered laminated metal screen filter element material. One such material is sold commercially under the trademark FUJIPLATE and consists of five layers of woven screen material laminated together and rigidly joined by a sintering or a heat and pressure welding operation (hereinafter, sintering) to form an integral, substantially rigid porous filter element. The inner mesh layers are formed of a very fine gauge wire and have filtration capabilities down to particle sizes as low as one micron. The inner mesh is overlaid with coarser supporting layers which provide strength and dimensional stability required of a typical flat surface filtering medium in which the solid contaminants are retained on the surface of the inner filtration control layers.

Applicant discovered that, by removing the outer, heavier gauge support layers of this commercial FUJIPLATE filter medium, the inner filtration layers can be drawn into a cup shape in a manner similar to drawing thin sheet metal without disrupting the sintered bond between the respective layers. It has also been found that this very fine gauge filtration element, without the heavier support layers, possesses sufficient dimensional stability and strength, when formed into a generally cylindrical cup configuration, to provide a highly durable, rigid filter. Further, the relatively high axial loads placed on such a filter element by the metering valve spring against the closed end of the cup provides increase strength and dimensional stability to the cylindrical sidewall, providing an effective, reliable filter element. The filter mesh is made from a very smooth, corrosion resistant, high strength metal material such as stainless steel, Hastelloy, or Inconel so that a filter formed from such material avoids the problem of cracking, splintering and particle shedding encountered by the prior art sintered powdered metal filter elements employed in control valves for the delivery of ultrapure gases.

BRIEF DESCRIPTION OF THE DRAWINGS

The forgoing and other features and advantages of the invention will be apparent from the detailed description contained herein below, taken in conjunction with the drawings, in which.

DESCRIPTION OF THE PREFERRED EMBODIMENTS

Figure 1:
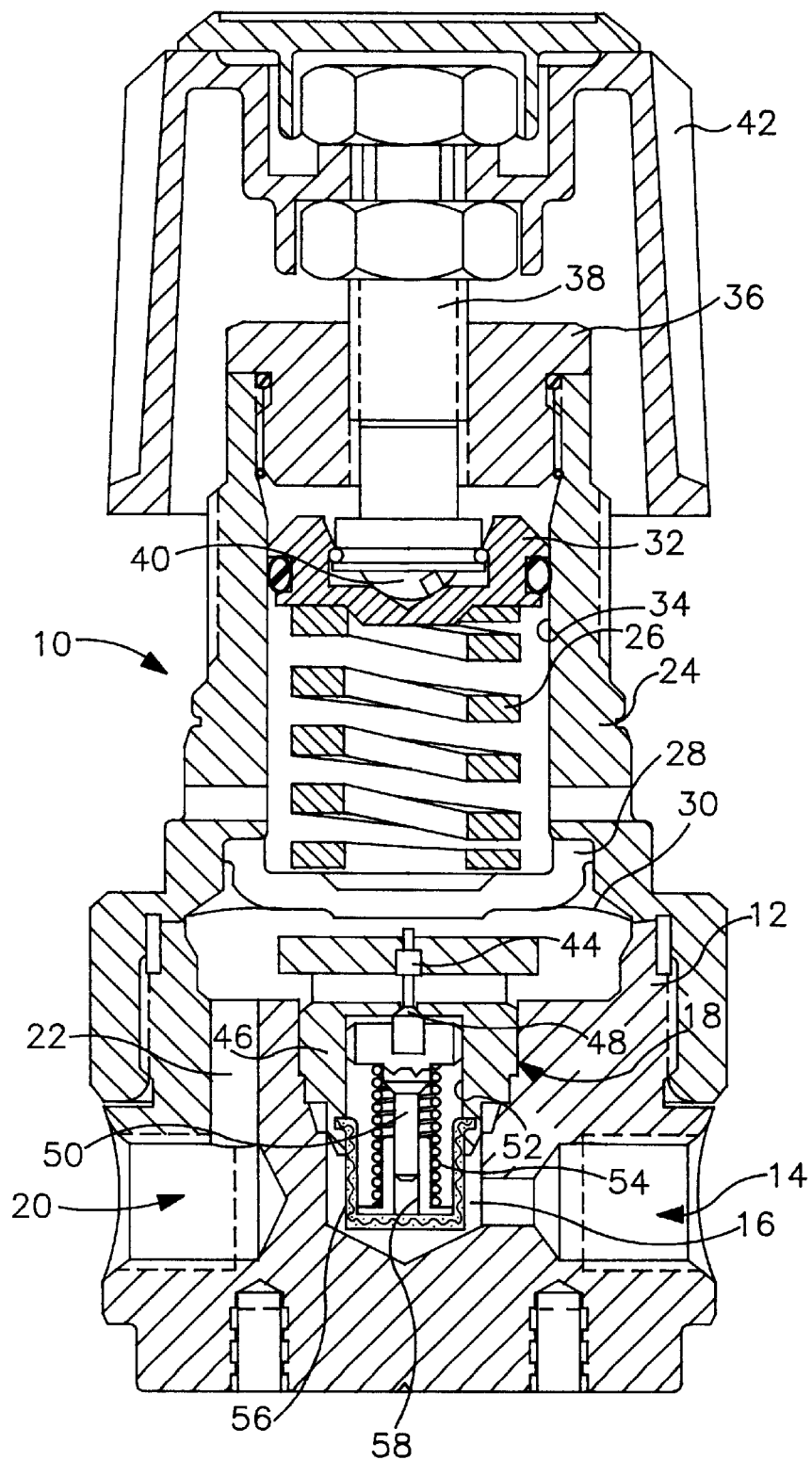
FIG. 1 is a sectional view of a gas flow regulator valve embodying the invention.

Referring now to the drawings in detail, a gas flow regulator valve is illustrated in section in FIG. 1 and is designated generally by the referenced numeral 10. The valve includes a valve body 12 having an inlet 14 communicating with a valve chamber 16 housing a metering valve capsule subassembly 18 (see FIG. 2). The metering valve subassembly 18 controls the flow of gas to the regulator valve outlet 20 through a passage 22 in the valve body 12. A bonnet 24 is threadably mounted on the valve body 12 and houses an adjusting spring 26 having one end bearing, through plate 28, on a metal diaphragm 30 disposed between the valve body and the bonnet, and its other end bearing against a piston or plunger 32 slidably mounted within the hollow interior 34 of bonnet 24. A bonnet cap 36 is threadably received in the open top end of bonnet 24, and an actuator stem 38 threadably supported in bonnet cap 36 has one end supported, through a low friction bearing element 40 on the plunger 32. The other, outwardly projecting end of stem 38 is rigidly, but adjustably, connected to an actuator handle 42 so that turning of the actuator handle will move the stem 38 in or out of the bonnet to adjust the pressure applied by the spring 26 to the diaphragm 30 to thereby control the force applied to the metering valve of assembly 15.

Figure 2:
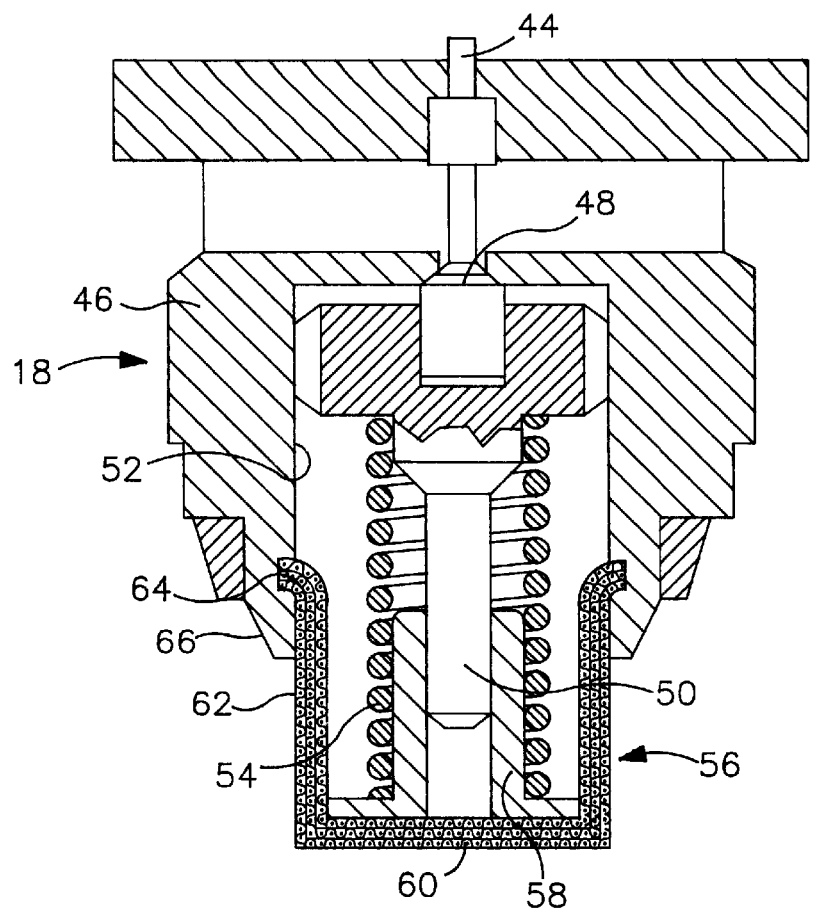
FIG. 2 is an enlarged sectional view of the metering valve and filter subassembly employed in the valve of FIG. 1.

Diaphragm 30, under influence of the bearing plate 28 and spring 26, bears on the upwardly projecting end of a valve stem 44 slidably mounted within an axial bore of a metering valve seat block 46, best seen in FIG. 2. Valve seat block 46 is threadably received in the valve chamber 16 of valve body 12 and provides a valve seat for a valve element 48 on the bottom end of stem 44. A pressure control plunger 50 is slidably mounted within an enlarged cylindrical passage 52 and is normally urged, by a control spring 54, upwardly into engagement with the valve element 48 to urge the valve into contact with the valve seat in the closed position. Axial grooves are formed in the periphery of plunger 50 to provide gas flow passages past the plunger. Valve seat block 46 supports, at the open bottom end of passage 52, a rigid cup shaped filter 56 having its open top end rigidly and permanently retained on the block 46 by inter-engagement between an outwardly directed flange element on the outer periphery of the filter and an inwardly crimped flange extending around the open bottom end of valve seat block 46. The spring 54 has its lower end supported by a valve guide and bearing element 58 on the closed bottom end wall 60 of filter 56.

As thus far described, the regulator valve assembly, and the metering valve subassembly or capsule are known and have been used and sold commercially. In the known structure, the filter 56 was a rigid filter element formed from a sintered powered metal having sufficient strength and dimensional stability to withstand the force applied by the spring 54 and the differential pressure of the gas across the filter element. As indicated above, however, such powdered metal filter elements have not been entirely satisfactory for various reasons, including the relatively frangible nature of the powdered metal structure, the tendency of the powdered metal particles to shed and thereby erode the valve and valve seat and contaminate the gas stream. These problems are magnified as it becomes necessary to filter out ever finer particulate matter, thereby requiring thinner filters and the use of finer metal powder particles to form the filter.

In accordance with the present invention, the filter 56 is in the form of a cup drawn from an initially flat, multilayered sheet, or blank, of a metal screen filter medium with the individual wires of the screen and the layers being sintered together to form an integral filter element. The mesh or screen is of very fine gauge and is closely woven so as to be capable of removing extremely small particulate matter from a gas flow stream. Filters capable of removing particles down to one micron in size are being formed in accordance with this invention.

Figure 3:
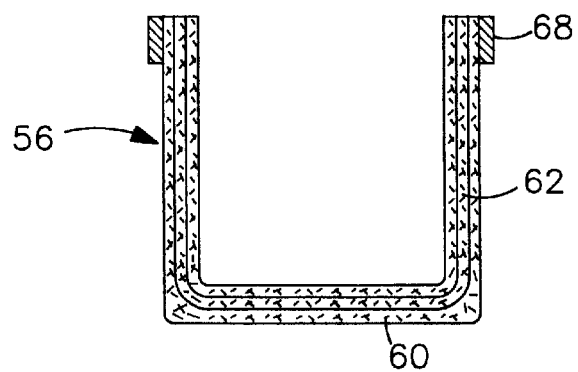
FIG. 3 is a sectional view of an alternate embodiment of the cup shaped filters shown in FIGS. 1 and 2.

As best seen in FIG. 2, the filter 56 comprises a substantially flat end wall 60 integrally formed with a generally cylindrical sidewall 62 terminating at its open top end in an outwardly turned flange 64. Flange 64 is employed, in conjunction with an inwardly turned or crimped flange 66 on the bottom of block 46 to rigidly and permanently retain the filter 56 on the open bottom end of the valve seat block. In an alternate embodiment of the assembly shown in FIG. 3, the flange 66 is omitted and a rigid metal rim 68 is positioned around the outer cylindrical surface of sidewall 66 adjacent the open top end thereof and rigidly joined thereto as by a welding or soldering operation, with the rim 68 serving the same function as flange 66.

Figure 4:
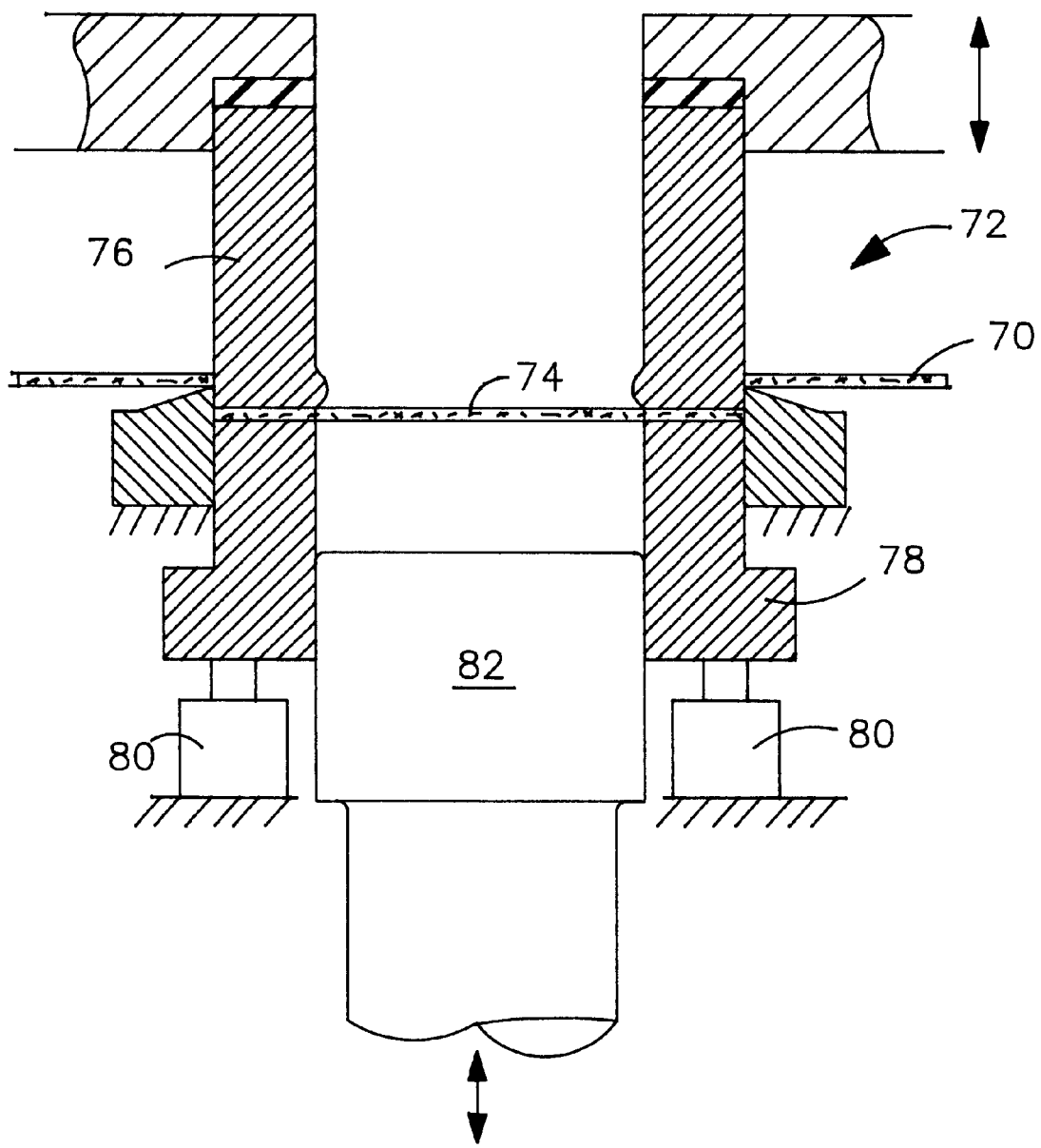
FIG. 4 is a schematic view, in elevation, showing a cup shaped filter being formed by a conventional drawing operation.

Referring now to FIG. 4, the steps in forming the filter 56 are illustrated schematically. In this figure, a flat sheet 70 of sintered screen filter element, such as the above described FUJIPLATE filter element with the rigid supporting or backing layers removed, is fed through a cupping machine 72, and an annular blank 74 is die cut from the sheet. The blank 74 is clamped in position beneath the central opening of a die element 76 and held in position with a clamping and guiding element 78 with a predetermined clamping force applied by fluid cylinder 80. A forming plunger 82 is then passed through aligned openings in the clamping member 72 and die 76 to draw the flat sheet 70 through the die and form the sheet into a cup configuration in accordance with conventional cupping or drawing practice.

When the finished filter is to be provided with a flange 64, the cup is not pressed completely through the die but rather stopped while a short peripheral edge portion of the original blank is retained between the opposing surfaces of the die and clamp, and if necessary this outturned peripheral edge portion may then be trimmed, as in a conventional die cutting operation, to provide a flange of the desired uniform diameter around the top of the finished filter element. Alternatively, the cup may be pressed completely through the die 72 and the cylindrical container thereafter trimmed, if necessary, to provide the exact height required for the filter and to provide a uniform smooth open top which may then be fitted with a rim 68 as described above.

It has been found, unlike the forming of conventional screen material, the drawing operation can be performed without displacing the individual strands of the respective mesh layers relating to one another and without disrupting the bond between adjacent mesh layers. Further, the size of the mesh openings may remain substantially unchanged or, depending upon the clearance between the plunger and the inside diameter of the die opening, the mesh openings may actually be reduced to provide a filter having the capacity to remove even smaller particles than the original filter element. For example, filters may be formed using this technique which will reliably remove particles down to one micron in size. By drawing the filter in the shape of a cup, and employing the cylindrical sidewall of the cup as the filter element, a relatively large filter area can be provided to assure against the filter becoming clogged and to provide an extended effective life of the filter.

It has also been found that a filter formed from such a material, employing a smooth, high strength metal wire such as 316 stainless steel, or corrosion or heat resistant alloy such as Hastelloy or Inconel, a very strong, dimensionally stable filter is provided. Thus, when permanently joined to the valve seat block 46, the filter provides a dimensionally stable support for the metering valve spring. This rugged, preassembled unit can be quickly assembled into the regulator valve assembly described above, or removed therefrom for replacement as may be necessary to provide different flow characteristics or for maintenance of the valve assembly.

While preferred embodiments of the invention have been disclosed and described in detail, it should be apparent that modifications may readily be made and it is therefore to be understood that the invention is not to be restricted to the disclosed embodiments, but rather it is intended to include all embodiments which would be apparent to one skilled in the art in which come within the spirit and scope of the invention.

What is claimed is:

1. In a gas flow regulator assembly for use in handling high purity and corrosive gases, including a valve body having an inlet and an outlet and a valve chamber providing fluid communication between the inlet and outlet, a bonnet and bonnet cap mounted on the valve body, a pressure regulating spring mounted in the bonnet, adjusting means mounted on the bonnet cap for applying an adjustable load to the regulating spring, and a flow control valve assembly for controlling the flow of gas from said inlet to said outlet, said control valve assembly comprising, a valve seat block mounted in said valve chamber, said valve seat block having an opening passing therethrough defining a valve seat, a valve member supported in said valve seat block for movement between a closed position engaging said valve seat to prevent the flow of gas from said inlet to said outlet and an open position spaced from said valve seat to permit the flow of gas from said inlet to said outlet, resilient means normally urging said valve member toward said closed position in opposition to the force of said pressure regulating spring, and a drawn cup shaped substantially rigid screen element mounted on said valve stem block and cooperating therewith to enclose said valve member and said resilient means, said drawn cup shaped screen having a generally cylindrical sidewall, a generally flat closed end wall, an open top, and means defining a mounting rim extending around its outer periphery at its open top, said end wall and said sidewall being integrally formed by a drawing operation from a substantially flat blank consisting of a plurality of layers of wire mesh laminated together and permanently joined by sintering, wherein said valve seat blank is formed with an annular flange dimensioned to telescopically receive said mounting rim, and wherein said annular flange on said valve seat block is deformed into contact with said mounting rim to permanently retain said cup shaped screen mounted on said valve seat block.

2. The gas flow regulator assembly defined in claim 1 wherein said mounting rim on said cup shaped screen comprises an integrally formed, outwardly directed flange extending around the outer periphery of said cup at its open top.

3. The gas flow regulator assembly defined in claim 1 wherein said mounting rim comprises an annular metal ring extending around and rigidly joined to the outer surface of said sidewall adjacent said open end.

4. The gas flow regulator assembly defined in claim 1 wherein said cup shaped screen comprises at least three layers of wire mesh screen disposed in overlying relation and secured together to form a dimensionally stable laminated screen body, said screen body being capable of filtering solid particles having a size of one micron or larger.

5. The gas flow regulator assembly defined in claim 1 wherein said resilient means comprises an elongated coiled spring having one end supported by said end wall and having its opposite end resiliently urging said valve member into engagement with said valve seat.

6. The gas flow regulator assembly defined in claim 5 wherein said mounting rim on said cup shaped screen comprises an integrally formed, outwardly directed flange extending around the outer periphery of said cup at its open top.

7. The gas flow regulator assembly defined in claim 6 wherein each said layer of wire mesh screen is formed from stainless steel wire.

8. The gas flow regulator assembly defined in claim 6 wherein each said layer of wire mesh screen is formed from a corrosion resistant alloy wire.

9. The gas flow regulator assembly as defined in claim 5 wherein said mounting rim comprises an annular metal ring extending around and rigidly joined to the outer surface of said sidewall adjacent said open end.

\* \* \* \* \*